United States Patent [19]

Polonsky

[11] Patent Number: 4,911,396
[45] Date of Patent: Mar. 27, 1990

[54] SUPPORT BRACKET

[76] Inventor: Eli Polonsky, 1608 S. Kenton, Aurora, Colo. 80012

[21] Appl. No.: 261,324

[22] Filed: Oct. 24, 1988

[51] Int. Cl.⁴ ............................................. F16M 13/00
[52] U.S. Cl. .................................... 248/547; 411/177;
411/429; 248/217.2; 248/497
[58] Field of Search ............... 248/475.1, 217.2, 217.3,
248/220.2, 225.2, 224.3, 547, 497; 411/177, 907,
908, 429, 374, 373

[56]  References Cited

U.S. PATENT DOCUMENTS

| 2,288,439 | 6/1942 | Dahm | 248/217.2 X |
| 2,490,854 | 12/1949 | Bozoti | 248/224.3 |
| 2,940,712 | 6/1960 | Lloyd-Young | 248/217.2 X |
| 3,433,449 | 3/1969 | Musante | 248/497 |

FOREIGN PATENT DOCUMENTS 258487  4/1913  Fed. Rep. of Germany ... 248/217.2
383158  11/1923  Fed. Rep. of Germany .
1118490  7/1968  United Kingdom ................ 248/317

Primary Examiner—Ramon S. Britts
Assistant Examiner—Karen J. Chotkowski
Attorney, Agent, or Firm—N. J. Aquilino

[57]  ABSTRACT

A support bracket to be secured to a horizontal or vertical supporting surface for supporting various weighted items formed of a base having a thickness and a plurality of sides disposed at an angle with respect to the longitudinal axis of the base. The sides are structured to position a plurality of nails or other similar fasteners with respect to the supporting surface and at an angle with respect to the base. The bracket includes a cover having interior side walls with the same angular relationship as the walls of the base, so with the cover in place, the interior side walls engage the nails between these walls and the angular sides of the base to maintain them in position. A suitable connector such as a hook is provided on the cover to support the article to be hung.

10 Claims, 2 Drawing Sheets

SUPPORT BRACKET

BACKGROUND AND DESCRIPTION OF THE INVENTION

The invention relates to support fixtures and, more particularly to brackets adapted to be attached to walls or ceilings such as acoustical, tile, plasterboard, and other similar surfaces which do not provide an adequate support for nails, screws or similar fasteners.

Conventional brackets used to support artwork, potted plants, decorations, and other similar devices normally use a single supporting nail, spike, or suitable mounting bolt inserted into the supporting surface an which may or may not be angled with respect to the supporting surface. Other brackets are supported by wall anchors which require holes to be pre-drilled into the supporting surface in order that the wall anchor be permanently secured in place. These type of brackets require a permanent mounting means which can only be removed with great difficulty and subsequent repair of the support surface. Other known hanger brackets use a plurality of angularly driven nails such as shown in the hanger and support fixtures in the U.S. Pat. Nos. to Cass (2,226,168) and Dahm (2,288,439), as well as German Pat. Nos. 383,158 and 258,487.

The present invention relates to a hanger bracket formed of a base including side walls disposed at an angle with respect to the longitudinal axis of the support base. Nails driven into the supporting surface engage the side walls therefore supporting the base with respect to the supporting surface, the side walls determining the angle which the nails are driven into the supporting surface. A cover having an interior wall surface at the same angle as the wall surface of the base engages the nails to securely capture them between the cover and base thereby preventing the nails from pulling free when a weight is attached to the support bracket. The angular relationship of the nails to the support surface provides a vector force which prevents the nails from being pulled free due to their angular disposition relative to the supporting surface. A plurality of nails are spaced around the edges of the base which provides maximum strength and support. The cover includes a means for securing it to the support base which is preferably a screw or other threaded fastener. Tightening the cover against the base captures the nails and maintains them in an angular position in the supporting surface. The cover may be any shape or design to provide a suitable aesthetic appeal in the environment or location where the support bracket is used. A suitable hook or other fastening means may be connected to the cover in order that various objects of the type described hereinabove may be supported on either a horizontal or vertical supporting surface. Alternately, any fixture or item to be hung may include the cover structure integrally formed in or on a flat wall surface of the fixture or item so it can be directly secured to the base.

Among the objects of the present invention are the provision of a support bracket adapted to support hanging objects on either a ceiling or wall. Another object is the provision of a support bracket which can be made of a variety of solid materials and which can be shaped and colored to fit any particular area or environment. Still another object of the present invention is the provision of a support bracket which uses minimal sized supporting surface engaging fasteners so that the removal of the bracket does not permanently scar the supporting surface. Still another object of the present invention is the provision of a support bracket which may be conveniently used without requiring exotic tools or mounting procedures and which is inexpensive to make and simple in design while providing maximum supporting strength.

Other objects of the present invention will become apparent by referring to the attached specification and accompanying drawings.

DESCRIPTION OF THE PREFERRED EMBODIMENTS

Figure 1:
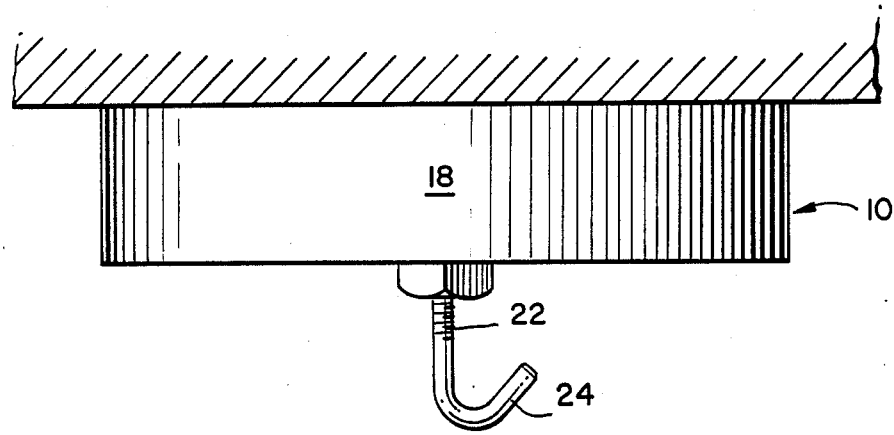
FIG. 1 illustrates the first embodiment of the support bracket of the present invention on a horizontal supporting surface.

The drawings illustrate a preferred embodiment of a support bracket 10 of the present invention. The bracket 10 includes a base 12 having a frustro-conical side wall 14, disposed at an angle with respect to the longitudinal axis of the base 12, and at an angle with respect to a bracket supporting surface such as a wall or ceiling. Preferably, the angle of the side wall 14 is approximately 30 degrees with respect to the supporting surface although other angles will operate satisfactorily. Nails 16, or other suitable fasteners, are used to secure the bracket 10 to the supporting surface as described hereinbelow.

The bracket includes a cover 18 having an interior frustro-conical wall 20 which is at the same angle and complimentary to the side wall 14 on the base 12. The interface between the side wall 14 on the base 12 and the interior wall 20 on the cover forms opposing gripping surfaces for the nails 16 to maintain the bracket in position on the supporting surface and for supporting objects therefrom. The cover 18 is secured to the base by a screw 22 or other suitable fastener so the interior wall 20 of the cover and the exterior wall 14 of the base fit together. A suitable hook member 24 is provided to form a hanger which can hold a variety of solid materials such as plants, decoration and the like.

Because of the angular relationship of the nails 16 inserted into the supporting wall or ceiling, a vector force is created which supports the base while preventing the nails from being pulled free by creating a force in the direction perpendicular to the gravity force of an item being supported by the bracket. The bracket is ideally suited for use with plasterboard walls or ceilings where nails are easily inserted and which are easily removed.

To remove the bracket 10 from the supporting surface, the cover fastener 22 is loosened and the cover 18 is removed. The nails 16 may then be removed by pliers or a similar gripping tool leaving the supporting surface relatively intact and also maintaining the integrity of the bracket so that it may be re-used.

Figure 2:
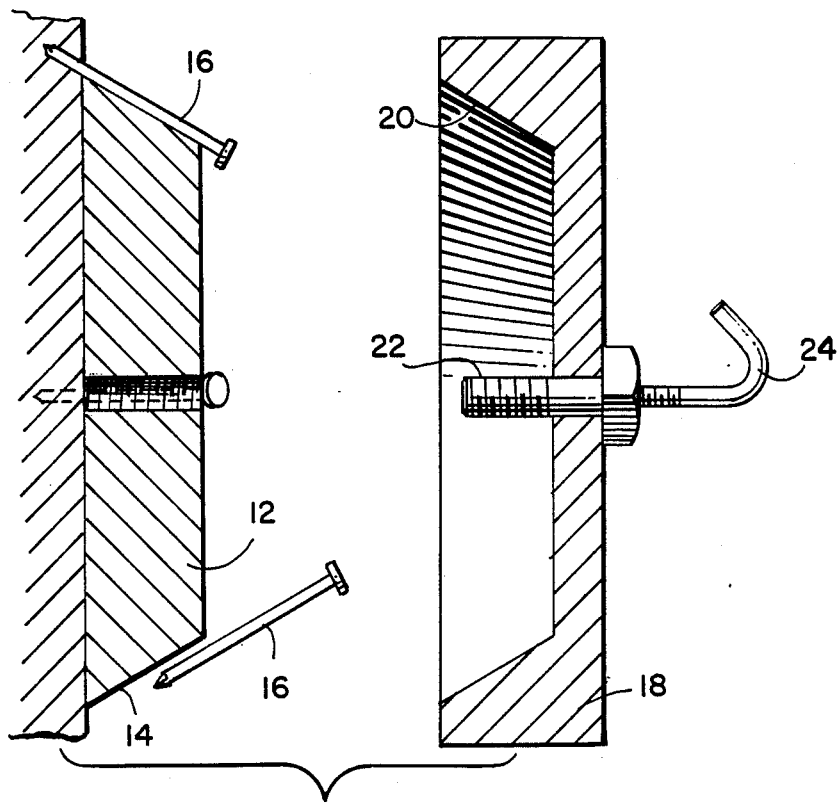
FIG. 2 illustrates the support bracket of FIG. 1 in an exploded position relative to a vertical supporting surface.
Figure 3:
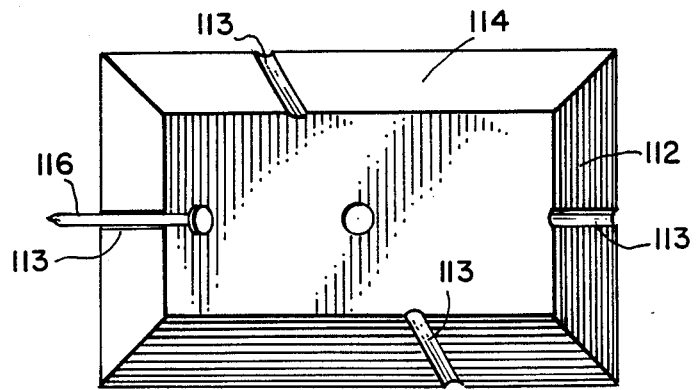
FIG. 3 illustrates a top plan view of a part of a second embodiment of the invention.

FIG. 3 shows a second embodiment of the support bracket 100 of the present invention including a base 112 which has flat sides rather than the circular configuration shown in FIGS. 1 and 2. In the embodiment, the walls 114 are trapezoidal in shape and also including a plurality of grooves 113. The grooves act to maintain nails 116 in position around the periphery of the surface of the wall 114. A cover, not shown, is then used to grippingly maintain the nails in position between the cover and the base as described with respect to the embodiments of FIGS. 1 and 2.

Figure 4:
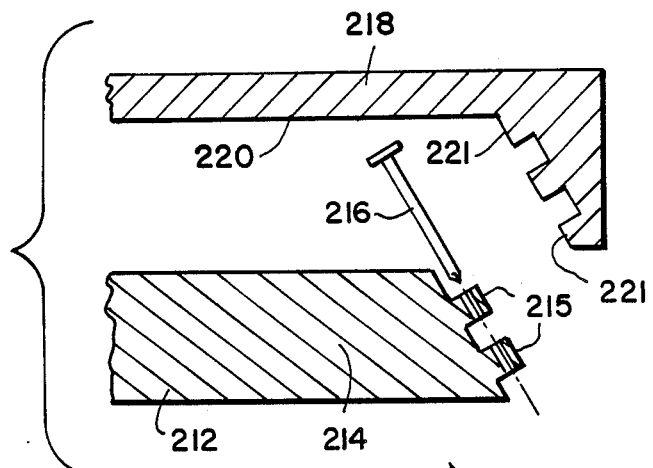
FIG. 4 illustrates a partial view of a third embodiment of the present invention.

FIG. 4 illustrates still another embodiment of a support bracket 200 of the present invention. In this embodiment, a base 212 has a side wall 214 including a plurality of pintal members 215 which extend upwardly from the wall surface. The pintal members 215 include openings which are structured to receive nails or other elongated fasteners. The cover 218 having an interior wall 220 also includes a plurality of support surfaces 221 which are complimentary to the pintal members 215. The pintal members 215 receive and position nails 216 and the support surfaces 221 engage the nails 216 to maintain them in position with the bracket 210 is secured as described hereinabove.

Figure 5:
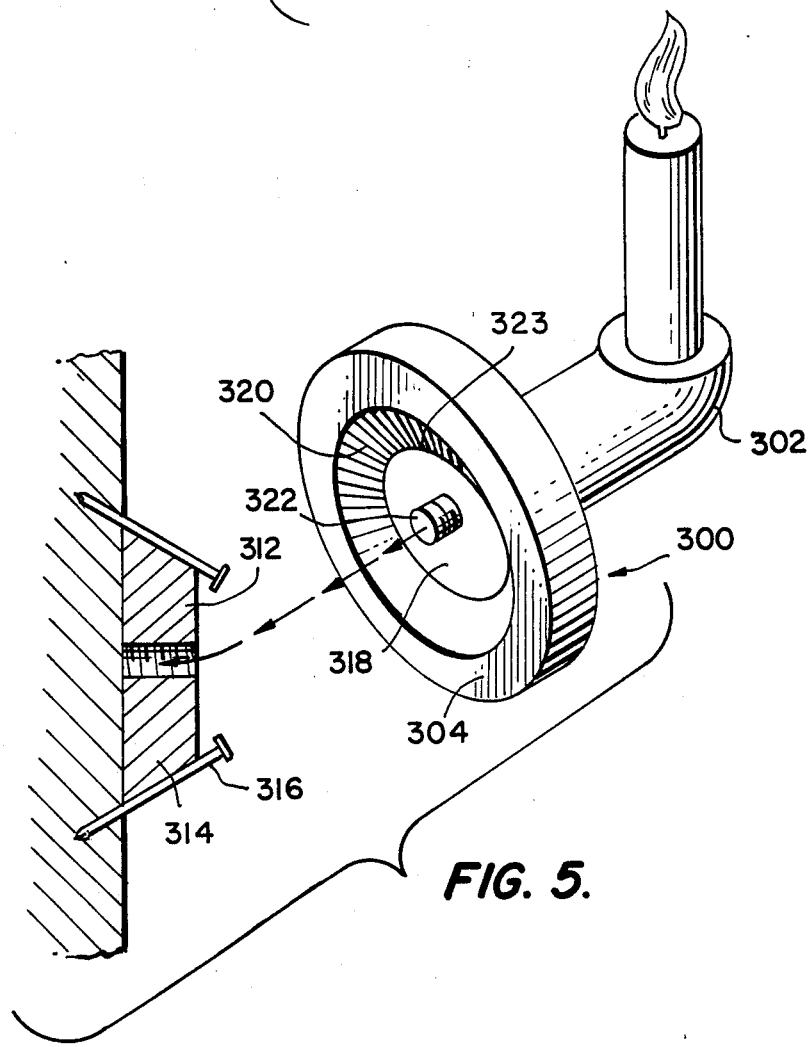
FIG. 5 illustrates a further embodiment of the present invention.

The cover could be integrally formed into or as a part of any device or fixture which is to be hung on a wall or ceiling such as a light fixture, wall lamp, cabinet, decoration or art device, or any other item which is to be hung on a wall. FIG. 5 shows a candle holder 300 having a candle support 302 and a rear wall 304. The candle holder 300 is mounted to a supporting surface by a mounting bracket formed of a base 312 having a frustro-conical side wall 314 which is structured to support nails 316 as with the embodiments described hereinabove. In this embodiment, the cover 318 is molded or otherwise integrally formed in the rear wall 304 of the candle holder 300 as a recess having a bottom surface 323 and a conical side wall 320 which is complimentary with the side wall 314 on the base. A mounting screw 322 is used to secure the candle holder 300 to the base 312 while securing the nails 316 in place as with the embodiments above.

Instead of a hook, any other suitable support may be used to mount various utility items such as shelf brackets or the like.

It will be appreciated that many other modifications may be made in the above structure in keeping within the scope of the present invention as defined in the following claims.

I claim:

1. A hanger bracket to be secured to a support for supporting an article to be hung, comprising:
   a base member including a frustro-conical side wall surface disposed at an angle with respect to said support;
   fastener means structured to be inserted in said support for supporting said hanger bracket on said support;
   said base member side wall surface forming a means for positioning said fastener means at an angle with respect to said support and forming a guide means for inserting said fastener means into said support at said angle;
   a cover for covering said base member, said cover including an interior frustro-conical wall surface at an angle complementary to the angle of said base member side wall surface; said interior frustro-conical wall surface and said base member side wall surface forming gripping means for gripping and maintaining said fastener means in place at said angle with respect to said support when said cover is connected to said base member; and,
   attachment means for supporting weighted objects to said hanger bracket.

2. The hanger bracket of claim 1 further including connector means for releasably connecting said cover to said support base.

3. The hanger bracket of claim 2 wherein said attachment means for supporting weighted objects is a hook integrally formed on one end of said connector means.

4. The hanger bracket of claim 1 wherein said cover is integrally formed as a surface of said article to be hung.

5. The hanger bracket of claim 1 wherein said side wall surface further includes grooves for positioning said fastener means.

6. A hanger bracket to be secured to a support for supporting an article to be hung, comprising:
   a base member including a plurality of flat side wall surfaces disposed at an angle with respect to said support;
   fastener means structured to be inserted in said support for supporting said hanger bracket on said support;
   said base member side wall surfaces forming a means for positioning said fastener means at an angle with respect to said support and forming a guide means for inserting said fastener means into said support at said angle;
   a cover for covering said base member; said cover including interior, flat wall surfaces at an angle complementary to the angle of said base member, side wall surfaces; said interior, angular wall surfaces and said base member side wall surfaces forming gripping means for gripping and maintaining said fastener means in place at said angle with respect to said support when said cover is connected to said base member; and,
   attachment means for supporting weighted objects to said hanger bracket.

7. The hanger bracket of claim 6 further including connector means for releasably connecting said cover to said base member.

8. The hanger bracket of claim 7 wherein said attachment means for supporting weighted objects is a hook integrally formed on one end of said connector means.

9. The hanger bracket of claim 6 wherein said cover is integrally formed as a surface of said article to be hung.

10. The hanger bracket of claim 6 wherein said side wall surfaces further include grooves for positioning said fastener means.

* * * * *